Patented Oct. 10, 1939

2,175,843

UNITED STATES PATENT OFFICE 2,175,843

POLYENE CARBOXYLIC ACIDS AND ESTERS AND MANUFACTURE THEREOF

Richard Kuhn and Christoph Grundmann, Heidelberg, Germany, assignors to Winthrop Chemical Company, Inc., New York, N. Y., a corporation of New York No Drawing. Application June 19, 1937, Serial No. 149,211. In Germany June 26, 1936

7 Claims. (Cl. 260—485)

This invention relates to the manufacture of polyene carboxylic acids and to certain products obtainable by such manufacture.

We have found that in polycarboxylic acid esters, which besides at least one acylated enolically bound hydroxyl group in α-position to a carboxylic acid ester group contain at least two conjugated double bonds the acyloxy group may be replaced by hydrogen. Polyene carboxylic acid esters may thus be readily obtained in accordance with the invention by transforming the acyl derivatives of oxalo compounds of unsaturated carboxylic acid esters in which the oxalo radical is connected with a carbon atom having at least one hydrogen atom and standing in α-position to a doubly bound carbon atom, by the action of mild reducing or hydrogenating agents into corresponding dihydro compounds and then causing a further double bond to form by splitting off of the acyl radical in the form of an acid, the polyene polycarboxylic acid ester formed being then subjected to saponification whereby the free acid is formed. The reaction is performed, for instance, in accordance with the following general reaction scheme, wherein R stands for an organic radical and "acyl" stands for an organic acid radical, such as acetyl and benzoyl,

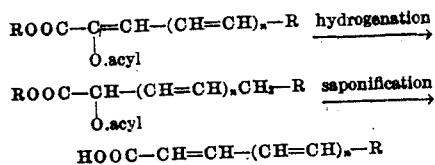

Aluminium amalgam and zinc dust have proved to be particularly suitable reducing agents. But also other mild reducing and hydrogenating agents have proved to be suitable. The addition of the two hydrogen atoms takes place at the end of the conjugated system. The splitting off of the acyl radical in the form of acid may be effected for instance even by treating the dihydroacyl compound with aqueous alkali or by heating it. When using alcoholic alkali in addition to the splitting off of acid a re-esterification also takes place depending on the alcohol employed. The saponification of the ester groups is carried out with the usual saponification agents. When causing alkali to react upon the dihydro acyl compounds there is not only a splitting off of the acyl radical with the formation of a further double bond, but also simultaneously saponification of the carboxylic acid ester group.

Our new process has proved to be useful particularly also for the manufacture of polyene dicarboxylic acids and their esters which contain three or more double bonds and accordingly have the general formula:

HOOC—(—CX=CX—)$_n$—COOH wherein $n$ stands for one of the numbers 3 to 7 and one X stands for hydrogen and the other X stands for one of the substituents hydrogen and methyl. Such acids formerly have not been obtained since their preparation could not be accomplished by known processes.

The products obtainable by the process of our present invention are intended to be used in the manufacture of pharmaceutics and organic condensation products. They are of particular interest in the production of compounds having a structure similar to that of vitamin A.

The invention is further illustrated by the following examples without being restricted thereto:

*Example 1.*—23.6 grams of α-acetoxy-muconic acid diethyl ester boiling at 150° C. under 2 mm. pressure are shaken for 3 hours in 200 ccs. of ether with 10 grams of aluminium amalgam (activated according to F. L. Hahn and E. Thieler, Ber. deutsche chem. Ges. 57 (1924) 671) while adding water drop by drop. The aluminum hydroxide which has been filtered with suction is thoroughly washed out with a mixture of methanol and ether. After distilling off the solvent the residue is distilled under reduced pressure. After slight amount of the first running about 20 grams of α-acetoxy-α.δ-dihydro-muconic acid diethyl ester distil over between 144–146° C. and at 2 mm. pressure as a colorless oil. On repeating the distillation the boiling point is at 132° C. under 1.2 mm. pressure.

When 2.9 grams of the acetyldihydroester is dissolved in 10 ccs. of methanol and 3 ccs. of 25% methylalcoholic caustic potash solution is added, the mixture, on heating, immediately takes a brown red color and solidifies after a few seconds to a magma of white silky crystal needles which are trans-trans-muconic acid diethyl ester melting at 156° C.

By saponification with aqueous caustic alkali, lye free muconic acid is directly obtained while heating. 1.77 grams of α-acetoxy-α-δ-dihydromuconic acid diethyl ester are boiled with 20 ccs. of 20% aqueous caustic potash solution and 20 ccs. of methyl alcohol for 2 hours under reflux. On acidifying with dilute hydrochloric acid 0.74 gram of trans-trans-muconic acid melting at 298° C. separate.

*Example 2.*—To a potassium ethylate solution obtained from 3.9 grams of potassium and 17.5 ccs. of absolute alcohol in dry ether 7.3 grams of oxalic acid diethyl ether and then 5.7 grams of β,β'-dimethylacrylic acid methyl ester are added drop by drop while cooling with ice. After a few minutes a greenish yellow potassium salt begins to separate which is filtered with suction after 12 hours standing in the refrigerator and washed.

10 grams of the potassium salt of α-hydroxy-γ-methyl-muconic acid methyl ethyl ester are heated with 30 ccs. of acetic acid anhydride for one hour on the water bath, whereby a strong brown coloration is formed. After cooling 100 ccs. of ether are added. The ether layer is washed with water several times. On evaporating, the crude acetyl compound remains as a deep brown colored oil which is immediately hydrogenated with 10 grams of activated aluminium amalgam in moist ether. After 12 hours the mixture is filtered with suction whereby an entirely colorless filtrate is obtained.

The oil which remains after evaporation is saponified by one hour's heating on the steam bath with a mixture of 20% caustic potash solution and methanol in the proportion of 1:1. The alcohol is distilled off. On acidifying with concentrated hydrochloric acid the trans-trans-β-methyl-muconic acid is obtained. The mother liquors on extracting with ether yield further quantities of the acid. After recrystallization several times from boiling water with the addition of a small quantity of active charcoal snow-white, star-like arranged needles melting at 230° C. are obtained.

The trans-trans-β-methyl-muconic acid melting at 232–233° C. is also obtained by heating the potassium salt of α-hydroxy-β-methyl-muconic acid ethyl ester in the above described manner with acetic acid anhydride, reducing the α-acetoxy-β-methyl-muconic acid ethyl ester boiling at 110° C. under 0.002 mm. pressure to the dihydro compound and saponifying the latter as indicated before. The potassium salt used as starting material is obtained by reacting 39 parts of potassium and 140 parts of absolute alcohol with ether, adding 73 parts of oxalic acid diethyl ester and after a short time adding 57 parts of α,β-pentene acid ethyl ester drop by drop. On standing in the cold the potassium salt precipitates. From its aqueous solution the free oxalo pentene ester is obtained on acidification with dilute hydrochloric acid. It crystallizes from petroleum ether in large white needle bunches melting at 60° C.

Example 3.—19.5 grams of α-acetoxy-hexatrien-dicarboxylic acid diethylester melting at 46° C. are dissolved in 300 ccs. of ether and reduced with 20 grams of activated aluminium amalgam. After 5 hours the mixture is filtered with suction through fibrous argillaceous earth which adsorbs the dihydro substance perceptibly, and then the fibrous earth is thoroughly washed with a mixture of methanol and ether. The combined filtrates are distilled after distilling off the solvent under reduced pressure. After a slight first running the 1-acetoxyhexadien-(2,4)-dicarboxylic acid-1,6-diethylester distils over as colorless and odorless viscous oil at 158–160° C. under 1 mm. pressure.

27 grams of the acetoxyhexadienester are dissolved in 200 ccs. of methanol and 200 ccs. of 20% caustic potash solution are added. The mixture is boiled under reflux for 4 hours and after cooling acidified with concentrated hydrochloric acid. Thereupon the hexatrien-1,6-dicarboxylic acid precipitates as an almost white, very fine crystal powder. It is centrifuged off and washed with a large amount of water.

In view of the exceedingly small solubility in all solvents not forming salts, it is possible to purify the acid which already is pure per se through the dimethyl ester. For this purpose 0.21 gram of acid is finely ground with 0.6 gram of phosphorous pentachloride and heated on the steam bath (calcium chloride tube) whereby liquefaction soon takes place with vivid hydrochloric acid evolution. The phosphorous oxychloride is then removed under reduced pressure at 50° C. The acid chloride remains in about yellow needles which, when pouring over methanol, clearly dissolve. After a few seconds the dimethylester begins to crystallize in white coarse needles. When recrystallized from methanol it melts at 172° C.

By saponifying for three hours with 2-normal caustic soda solution on the steam bath, whereby the whole dissolves, the hexatrien-1,6-dicarboxylic acid is obtained as snow-white crystal powder. From a very large quantity of boiling 50% alcohol the substance is obtained in very thin curved needles.

When heated in the customary manner the dicarboxylic acid shows no melting point up to 360° C. but gradually decomposes with dark coloration from 280° C. on. The dimethylester melts at 172° C.

Example 4.—7.2 grams of γ-methylsorbinic acid ethyl ester (Ann. 434 (1923) 162) and 7.5 grams of oxalic acid diethylester are condensed with the quantity of alcoholate obtained from potassium. The potassium salt separating from the dark red solution is dissolved in cold water and decomposed with 2-normal sulfuric acid while cooling. From dilute alcohol the oxalo-γ-methylsorbinic acid diethylester separates in light yellow needles melting at 103.5° C.

1.8 grams of oxalo-γ-methylsorbinic acid diethylester are heated on the water bath with 10 ccs. of acetic anhydride for half an hour. After distilling off the anhydride under reduced pressure the remaining brownish oil is directly subjected to reduction with 5 grams of activated aluminium amalgam in 100 ccs. of ether. After 5 hours the mixture is filtered with suction and the fibrous argillaceous earth thoroughly extracted with a mixture of ether and methanol. The oil remaining after the ether has evaporated is boiled with 50 ccs. of 2 normal caustic potash solution for 3 hours. On acidifying the cooled solution with concentrated hydrochloric acid the 3-methylhexatrien-1,6-dicarboxylic acid precipitates as an almost white crystal powder. For purification the mixture is boiled with 50% acetic acid, the undissolved part is treated with dilute sodium carbonate solution, boiled with a small quantity of active charcoal and the filtrate acidified with dilute hydrochloric acid. In this manner the 3-methylhexatrien-1,6-dicarboxylic acid is obtained as a snow-white micro-crystalline powder which melts at 286° C. In organic solvents the substance is difficultly soluble.

Example 5.—14 grams of oxalo-octatrienester (mixture of methyl-ethyl- iso-propylester) are acetylated with 200 ccs. of acetic acid anhydride under pure nitrogen at 100° C. for one hour. After the excess anhydride has been removed under considerably reduced pressure the remaining red oil is dissolved in 1000 ccs. of ether and reduced with 50 grams of aluminium amalgam until the color of the solution has turned light yellow (2 hours). The aluminium hydroxide is thoroughly washed with ether and methanol, the solution is evaporated under reduced pressure and the remaining thick yellow oil is dissolved in 200 ccs. of methanol. On the addition of 50 ccs. of 25% methyl alcoholic caustic potash solution a dark coloration and a slight heating takes place. After a few seconds the dimethylester of the octatetraen-1,8-dicarboxylic acid begins to separate in yellow needles. The product is washed on the suction filter with a large quantity of methanol until the filtrate runs off colorless and the ester appears light yellow. After crystallizing twice from chloroform-methanol bevelled lemon-yellow prisms melting at 212° C. are obtained.

1.13 grams of dimethylester are boiled for one hour under reflux with 200 ccs. of 5% caustic potash solution whereby the whole mixture is dissolved. The almost colorless alkaline solution is acidified drop by drop with concentrated hydrochloric acid while still hot, whereby the octatetraen-1, 8-dicarboxylic acid precipitates as a vivid chrome yellow crystalline powder in an almost calculated yield. It is gradually washed with a large quantity of water, alcohol and chloroform, wherein it is entirely insoluble.

The starting material is obtained in the following manner:

From 1.3 grams of potassium the isopropylate is prepared in the usual manner under ether and treated with 2.4 grams of oxalic acid diethylester. Then 2.5 grams of freshly prepared octatrien acid methyl ester (see Berichte der Deutschen Chemischen Ges. 63 (1930) page 2140) which has been diluted with 20 ccs. of absolute ether are slowly added drop by drop, whereby the solution first turns to a discolored brown. After a few minutes the color turns to a dark red. The condensation is completed by 48 hours standing in the refrigerator, then the deep carmine red resinous precipitate is filtered with suction, washed with a large amount of ether and dissolved in 50 ccs. of ice cold water. The red oil which has separated on acidification with 2 normal sulfuric acid is taken up in 100 ccs. of ether, the upper layer is twice washed with water and diluted with the equal volume of benzene. The solution is filtered through two columns of calcium carbonate (purissimum, 15-20 cm. high, 4.5 cm. diameter), for instance as described in "Zeitschrift für Physiologische Chemie" 220, page 247, and the chromatogram is evolved by washing with a mixture of benzene-ether=1:1. In this way a light yellow zone runs into the filtrate rapidly, while numerous discolored rings remain in the column. The filtrate which has been evaporated under reduced pressure leaves an orange yellow residue crystalline for the greater part, which is dissolved in 15 ccs. of 80% methanol while hot. On cooling in the refrigerator a mixture of oxalo-octatriencarboxylic acid-methyl-, ethyl- and isopropylester is obtained which crystallizes with difficulty.

Example 6.—To a potassium-ethylate solution obtained from 3.9 grams of potassium in the usual manner 7.3 grams of oxalic acid diethyl ester diluted with the equal volume of ether are added drop by drop in nitrogen atmosphere. After 10 minutes 7.7 grams of hexadien-1, 3-carboxylic acid-1-ethyl ester are added. The reaction mixture is left standing for 4 days under nitrogen whereby the salt of the oxalic ester separates slowly in thick orange red crusts at the wall of the tube. By the addition of 300 ccs. of absolute ether dissolved potassium salt is precipitated, filtered with suction and washed with ether. After dissolving in water, acidification and extraction with ether the mixture is dried over calcium chloride after washing of the ether solution and evaporated in vacuo, whereby the oxalo-hexadien-1, 3-carboxylic acid-1-ethyl ester remains as a viscous yellow red oil.

The crude oxalo ester is heated on the water bath with 15 ccs. of acetic acid anhydride for one hour and the excess anhydride distilled off in vacuo. The residue is dissolved in 100 ccs. of ether and reduced with 5 grams of aluminium-amalgam for 4 hours. The ethereal solution which has been filtered off from the aluminium hydroxide is concentrated on the steam bath and the residue saponified with aqueous-alcoholic potash solution. After the alcohol has been distilled off the 2-methyl-hexatrien-dicarboxylic acid-1, 6 precipitates as a white sandy powder on acidification with concentrated hydrochloric acid. After recrystallizing twice from glacial acetic acid the acid is obtained in coarse pointed white prisms melting at 245–247° C.

The starting material is obtained in the following manner:

38 grams of pentenal, 76 grams of bromo-acetic acid ethyl ester and 30 grams of zinc borings are heated to boiling in 150 ccs. of dry benzene for 1 hour. The reaction takes place immediately and proceeds evenly until almost all zinc is consumed. After cooling the mixture is decomposed with 2 normal sulfuric acid and the benzene layer thoroughly washed with dilute caustic soda solution and water. After drying over calcium chloride, distilling off of the benzene, the residue is subjected to fractional distillation by means of the Widmer-spiral, whereby 34 grams of 2-hydroxy-hexene-3-carboxylic acid ethyl ester boiling between 112–114° C. (11 mm. Hg) are obtained.

The crude hydroxyl ester is heated with one third of its weight of finely powdered potassium-bisulfate in vacuo for 15 minutes to 70-80° C. whereby splitting off of water is effected. By stronger heating the unsaturated ester is distilled over as completely as possible and taken up in a small quantity of ether. For removing traces of acid present the mixture is washed with sodium bicarbonate solution. After drying and distilling off the ether it is subjected to fractional distillation in vacuo by means of the Widmer-spiral, whereby the hexadien-1, 3-carboxylic acid-1-ethyl ester boils at 90–92° C. (12 mm. Hg).

Example 7.—From 3.9 grams of purified potassium and 18 ccs. of absolute alcohol an alcoholate solution is obtained in 50 ccs. absolute ether in an atmosphere of pure nitrogen. Then 7.3 grams of oxalic acid-diethyl ester diluted with the equal volume of ether are slowly added drop by drop. After 10 minutes 8.4 grams of 1-methyl-hexadien-1, 3-carboxylic acid-1-ethyl ester are added in the same manner whereby the reaction mixture takes a light red coloration. After 3 days the potassium salt of the oxalo ester has settled at the wall of the tube in thick orange red crusts. After precipitation of the salt still present in the solution in ether and decomposition by acidification with 2 normal sulfuric acid an almost colorless oil is obtained which on storing in the refrigerator solidifies to crystals to the greatest part. For purification the crude product is boiled several times with small quantities of benzine boiling at 70–80° C. until only brown resins remain. On cooling the oxalo-1-methyl-hexadien-1, 3-carboxylic acid-1-ethyl ester crystallizes from the benzine extracts in yellowish granules. It melts at 70° C.

2.5 grams of oxalo ester are heated on the water bath with 10 ccs. of aceto anhydride for half an hour. Then the excess acetic acid anhydride is distilled off in vacuo at 60–70° C. The acetyl compound remains as a viscous yellow oil which is dissolved in 100 ccs. of ether and reduced with aluminium-amalgam with the addition of a small quantity of water. After two hours the solution is filtered with suction, the hydroxide is washed with ether and the ether distilled off. The remaining viscous colorless oil, the acetoxydihydro compound is dissolved in 20 ccs. of methanol and boiled with the equal volume of 25% caustic potash solution for half an hour under reflux. The methyl alcohol is then distilled off as much as possible and the alkaline liquid carefully acidified with concentrated hydrochloric acid, whereupon the dicarboxylic acid separates in cheesy crystalline flakes. After three times recrystallizing from glacial acetic acid the 1,5-dimethyl-hexatrien-dicarboxylic acid-1,6 is obtained in coarse whetstone-like crystals melting at 271° C.

The dicarboxylic acid is almost insoluble in water also in the boiling heat, it is much better soluble in organic solvents, in particular glacial acetic acid, alcohol and dioxane especially when heated than the unmethylated hexatrien-dicarboxylic acid.

The 1-methyl-hexadien-1,3-carboxylic acid-1-ethyl ester used as starting material is obtained in the following manner:

35 grams of α-pentenal, 75 grams of α-bromo-propionic acid-ethyl ester and 35 grams of zinc borings are heated to boiling with 150 ccs. of dry benzene whereby vivid reaction immediately takes place. The reaction is kept moderate by occasional cooling with water. Condensation is completed under reflux by 20 minutes boiling. The cooled reaction mixture is decomposed with 2 normal sulfuric acid and the benzene layer washed several times with soda solution and water. After drying over calcium chloride the benzene is distilled off and the residue subjected to fractional distillation in vacuo whereby the main quantity distils over between 90 and 100° C. (10 mm. Hg).

16 grams of the said product are heated with 10 grams of potassium bisulfate for 15 minutes at 12 mm. Hg to 70–90° C. By further raising the temperature the unsaturated ester is distilled over, taken up in a small quantity of ether and washed with sodium bicarbonate solution. After drying over calcium chloride the product is again rectified in vacuo by means of the Widmer spiral. The 1-methyl-hexadien-1,3-carboxylic acid-1-ethyl ester thereby distils over as a colorless oil of aromatic odor at 94–95° C. (11 mm. Hg).

*Example 8.*—From 3.5 grams of potassium a potassium ethylate solution is prepared with 15 ccs. of ethyl alcohol in 50 ccs. of absolute ether in nitrogen atmosphere. 6.5 grams of freshly distilled oxalic acid-diethyl ester diluted with the equal volume of absolute ether are added drop by drop while cooling with ice. After 20 minutes the freshly prepared solution of 5.5 grams of decatetraenic acid ethyl ester is caused to flow rapidly into 100 ccs. of dry luke-warm ether. The light yellow color of the reaction mixture thereby immediately turns to deep-indigo-blue. After some hours it turns into a deep red brown coloration, while an almost black potassium salt separates in granules. After standing for 60 hours at ordinary temperature in nitrogen the mixture is acidified with 50 ccs. of 2 normal sulfuric acid, diluted with half a liter of ether, and the deep red ethereal solution is washed several times with water. The ethereal solution is then subjected to chromatographic purification by calcium carbonate (height of column 25 cm., diameter 4.5 cm.). On evolution with ether a lemon-yellow layer enters the filtrate, while the resinous contaminations remain in the column as dark brown, discolored rings. The filtrates are evaporated in vacuo whereupon the oxalo-decatetraenic acid-diethyl ester impregnated with some oil remains in the crystalline state. After recrystallizing twice from benzene-benzine the product is obtained in orange colored needle rosettes melting at 147° C.

5 grams of oxalo-decatetraenic acid ester are heated on the water bath for one hour with 20 ccs. of acetic acid anhydride. The anhydride not having gone into reaction is evaporated in vacuo at 60–70° C. as much as possible. The remaining acetyl compound, an orange-red oil, which on cooling solidifies to crystals is dissolved in 100 ccs. of ether and reduced with 5 grams of aluminium-amalgam until the solution is only weak yellow (after 20–40 minutes). After filtering with suction the aluminium hydroxide is washed with ether and the combined filtrates concentrated in vacuo. A viscous, almost colorless oil remains which is dissolved in 10 ccs. of methanol and treated with 20 ccs. of 25% methanolic caustic potash solution. With heating and dark brown coloration acetic acid splits off and after a few seconds the separation of the decapentaen-1,10-dicarboxylic acid-dimethylester commences. After standing for several hours in the refrigerator the solution is filtered with suction and washed with a large quantity of methanol until the latter runs off colorless. After recrystallizing several times from glacial acetic acid orange yellow, long, thin, felty needles with a silky luster are obtained which melt at 223° C.

The decapentaen-1,10-dicarboxylic acid dimethylester sublimates under the microscope (melting point apparatus according to L. Kofler and H. Hilock) from 180° C. on in beautifully shaped, dark yellow quadrangular columns. Concentrated sulfuric acid dissolves with yellow coloration which after a short time turns to indigo blue over emerald green (mixed color).

50 mgs. of decapentaen-1,10-dicarboxylic acid-dimethylester are boiled for one hour under reflux with 10 ccs. of 10% caustic potash solution with the addition of the equal volume of ethyl alcohol, whereupon the ester is saponified without the di-potassium salt being completely dissolved. On diluting with a sufficient quantity of water a clear, only weak-yellow colored solution is obtained from which the decapentaen-1,10-dicarboxylic acid is precipitated as a bright chrome yellow micro-crystalline powder by means of concentrated hydrochloric acid. The solution is centrifuged off and the acid washed several times with water, methanol and chloroform. It is absolutely insoluble in all non-basic organic solvents. The substance melts at 300° C. with decomposition.

*Example 9.*—2.5 grams of oxalo-tetradecahexaenic acid-diethylester are heated on the water bath with 300 ccs. of acetic acid anhydride in nitrogen atmosphere, whereupon the whole mixture enters into solution with red coloration.

After some heating the solution is evaporated under reduced pressure and the residue recrystallised from benzene-benzine in the proportion 1:1. It is further recrystallized from hot butanol, whereupon the α-acetoxy-tetradecaheptaene-dicarboxylic acid-diethylester is obtained in brownish red curved leaflets melting at 167° C. It is readily soluble in chloroform and benzene, slightly soluble in ether, alcohol and benzine.

1.4 grams of the said compound are dissolved in a mixture of 400 ccs. of benzene and 1000 ccs. of ether and reduced with 50 grams of activated aluminium amalgam while adding water drop by drop. By continuous spectroscopic observation it can be established when the characteristic absorption bands of the starting material have just disappeared. According to the activity of the amalgam this takes place after a shorter or longer period of time. Hydrogenation is then immediately interrupted by filtering with suction. The aluminium is washed with a small quantity of ether and concentrated in vacuo under reduced pressure to a small volume, whereupon the 1 - acetoxy - tetradeca-hexaen - 2,4,6,8,10,12 - dicarboxylic acid-1,14-diethyl ester crystallizes in light, sulfur-yellow, hexagonal, thin, brilliant leaflets. It is recrystallized from benzene-ether, whereby long, thin, bevelled prisms are obtained which melt at 163–165° C. (short thermometer).

0.90 gram of this compound is dissolved in 200 ccs. of pyridine and 5 ccs. of 10% sodium ethylate solution are added whereupon the coloration changes to a deep blue. On extracting with the admission of air the color within a short time changes over dark green (mixed color) to red. The product is then diluted with 2000 ccs. of chloroform, washed several times with 2 normal sulfuric acid and water and the dried chloroform solution chromatographed by aluminium oxide (height of the column 30 cm., diameter 4 cm.). On evolution with chloroform the tetradeca - heptaen - 1,3,5,7,9,11,13 - dicarboxylic acid-1,14-diethylester migrates as orange yellow zone into the filtrate, while by-products remain in the upper part of the column as orange colored ring. The filtrate is evaporated in vacuo under reduced pressure and the residue recrystallized from 100 ccs. of glacial acetic acid. In this manner orange red, rhombic leaflets with a strong metallic luster melting at 217° C. (short thermometer) are obtained.

The diethyl ester is readily soluble in pyridine and chloroform, readily soluble in hot glacial acetic acid, only slightly soluble in the other organic solvents. With concentrated sulfuric acid it yields a Prussian blue solution which after some time turns to violet and finally becomes pale.

5 grams of the ester are dissolved in 500 ccs. of boiling dioxane and treated with 100 ccs. of 10% methanolic caustic potash solution. After a short time the solution becomes turbid and the potassium salt precipitates as a yellow flocculent precipitate. After standing for 4 hours at 37° C. the solution is centrifuged off, the precipitate made into a paste with 2 normal hydrochloric acid whereby it takes an orange red coloration and washed four times with water at the centrifuge. After drying it is recrystallized from pyridine. The tetradeca-heptaen-1,3,5,7,9,11,13-dicarboxylic acid-1,14 is obtained in brick red, rectangular tablets. On heating the dicarboxylic acid decomposes gradually above 300° C. without melting.

The acid is only soluble in pyridine and similar bases. Aqueous alkalies do not take up anything. The absorption bands (448 and 420 μ) observed in pyridine have a wave length which is 2 μ shorter than that of the dimethyl- and diethyl-ester. Concentrated sulfuric acid turns to a Prussian blue coloration.

The oxalo-tetradeca-hexaenic acid diethyl ester used as starting material is obtained as follows:

500 grams of crotonaldehyde are heated on the water bath for a short time after the addition of a mixture of 5 ccs. of piperidine and 5 ccs. of glacial acetic acid. The reaction mixture is diluted with 2 liters of ether, filtered off from the precipitate, the ethereal solution washed with water, dried and distilled off. Unchanged crotonaldehyde evaporates under reduced pressure on heating in the steam bath. The dodecapentaen-2,4,6,8,10-al-1 (about 20 grams) crystallizes from the residue after the addition of one third of its volume of 80% methylalcohol. From the mother liquor 80–100 grams of crystallized octatrienal are obtained on distillation. The latter condenses at ordinary temperature with crotonaldehyde in the presence of piperidine and glacial acetic acid to a waxy mass from which after dilution with ether and separation of insoluble parts further quantities of dodecapentaenal (melting at 166° C.) may be obtained. 9 grams of dodecapentaenal are then heated with 9 grams of malonic acid in 90 ccs. of pyridine with the addition of 5 drops of piperidine under carbonic acid for one hour on the steam bath. From the deep red mixture dark red crystals of the pyridine salt separate on standing in the refrigerator. On washing of the separated crystals with ether the pyridine salt decomposes. The dodecapentaenal-malonic acid formed is boiled for seevral hours with a mixture consisting of equal parts of glacial acetic acid and acetic acid anhydride. Thereby first the dicarboxylic acid enters into solution and the tetradeca-hexaen-2,4,6,8,10,12-acid-1 separates soon in orange-yellow granules, which melt at 265–266° C. from glacial acetic acid. The methyl ester obtained therefrom by means of diazo methane melts at 220° C. A hot solution of 2 grams of this ester in 150 ccs. of pyridine is added to a solution of potassium alcoholate, obtained from 4 grams of potassium powder, 50 ccs. of ether and 14 grams of anhydrous alcohol, and 7.5 grams of oxalic acid diethyl ester. After standing for several days the solution is diluted with one liter of ether and decomposed with 1.5 liters of 2 normal sulfuric acid. The ethereal layer is filtered off and reepatedly washed with water. After chromatographic purification of the solution the oxalo-tetradeca-hexaenic acid-diethyl ester is obtained in the form of copper red crystals melting at 190–191° C. (from acetic ester).

We claim:

1. The process which comprises transforming an acyl derivative of an oxalo compound of an unsaturated carboxylic acid ester in which the oxalo radical is connected with a carbon atom having at least one hydrogen atom and standing in α-position to a doubly bound carbon atom, by the action of a mild reducing agent into the corresponding dihydrogenated compound, causing a further double bond to form by splitting off of the acyl radical in the form of acid by heating, and saponifying the ester obtained.

2. The process which comprises transforming an acyl derivative of an oxalo compound of an unsaturated carboxylic acid ester in which the oxalo radical is connected with a carbon atom having at least one hydrogen atom and standing in α-position to a doubly bound carbon atom, by the action of aluminium amalgam into the corresponding dihydrogenated compound, causing a further double bond to form by splitting off of the acyl radical in the form of acid by heating, and saponifying the ester obtained.

3. The process which comprises transforming an acyl derivative of an oxalo compound of an unsaturated carboxylic acid ester in which the oxalo radical is connected with a carbon atom having at least one hydrogen atom and standing in α-position to a doubly bound carbon atom, by the action of aluminium amalgam into the corresponding dihydrogenated compound, causing a further double bond to form by splitting off of the acyl radical in the form of acid and saponifying the ester groups by heating with aqueous alkali.

4. The process which comprises transforming an acyl derivative of an oxalo compound of an unsaturated carboxylic acid ester in which the oxalo radical is connected with a carbon atom having at least one hydrogen atom and standing in α-position to a doubly bound carbon atom, by the action of zinc dust into the corresponding dihydrogenated compound, causing a further double bond to form by splitting off of the acyl radical in the form of acid by heating, and saponifying the ester obtained.

5. The process which comprises transforming an acyl derivative of an oxalo compound of an unsaturated carboxylic acid ester in which the oxalo radical is connected with a carbon atom having at least one hydrogen atom and standing in α-position to a doubly bound carbon atom, by the action of zinc dust into the corresponding dihydrogenated compound, causing a further double bond to form by splitting off of the acyl radical in the form of acid and saponifying the ester groups by heating with aqueous alkali.

6. The products of the general formula:

$$ROOC-(-CX=CX-)_n-COOR$$

wherein R stands for one of the substituents hydrogen and alkyl, one X stands for hydrogen, the other X stands for one of the substituents hydrogen and methyl, and $n$ stands for one of the numbers 3 to 7.

7. 2-Methyl-hexatrien-dicarboxylic acid.

RICHARD KUHN.
CHRISTOPH GRUNDMANN.